United States Patent [19]

Mabuchi

[11] 4,195,242

[45] Mar. 25, 1980

[54] BRUSH DEVICE

[75] Inventor: Takaichi Mabuchi, Matsudo, Japan

[73] Assignee: Mabuchi Motor Co., Ltd., Tokyo, Japan

[21] Appl. No.: 841,362

[22] Filed: Oct. 12, 1977

[30] Foreign Application Priority Data

| | | | |
|---|---|---|---|
| Apr. 28, 1977 | [JP] | Japan | 52/54467[U] |
| May 27, 1977 | [JP] | Japan | 52/61927 |
| Jun. 3, 1977 | [JP] | Japan | 52/72104[U] |
| Jul. 13, 1977 | [JP] | Japan | 52/93057[U] |
| Jul. 13, 1977 | [JP] | Japan | 52/93058[U] |

[51] Int. Cl.[2] .......... H02K 13/00

[52] U.S. Cl. .......... 310/239

[58] Field of Search .......... 310/239, 242, 244, 246, 310/250–253, 40 MM

[56] References Cited

U.S. PATENT DOCUMENTS

| | | | |
|---|---|---|---|
| 3,296,473 | 1/1967 | Mabuchi | 310/239 |
| 3,450,916 | 6/1969 | Mabuchi | 310/244 |
| 3,475,635 | 10/1969 | Mabuchi | 310/239 X |
| 3,656,018 | 4/1972 | Maher | 310/242 |

*Primary Examiner*—Donovan F. Duggan

[57] ABSTRACT

A brush device for a small electric motor wherein a brush integrally constructed of a commutator slide, a brush base and a terminal extending from the brush base is inserted into a terminal hole provided on a motor case, and sharp burrs on the tip of a cut and raised piece provided on the brush base is caused to cut into the inside wall surface of the terminal hole so that the brush is securely fixed to the motor case.

15 Claims, 20 Drawing Figures

BRUSH DEVICE

BACKGROUND OF THE INVENTION

1. Field of the Invention

This invention relates to a brush device wherein a brush integrally constructed of a commutator slide, a brush base and a terminal extending from the brush base is inserted into a terminal insert hole provided on a motor case cover which fixedly holds the brush, and a cut and raised piece provided on the base of the brush is caused to cut into the motor case cover so that the brush can be securely fixed to the motor case cover.

2. Description of the Prior Art

Heretofore, a brush device for a small electric motor has had a brush which is integrally constructed of, for example, a brush part and a terminal part and is fixed to a motor case cover with an appropriate means. In such a fixing means, however, there have been a number of problems such as unwanted movement or loosening of the brush with respect to the terminal insert hole provided on the motor case cover. To overcome them, various fixing means have been devised, and an exemplary structure takes the form of a cut and raised piece provided on the terminal part of the brush, the tip of which engages with a shouldered part provided on the inside wall of the terminal insert hole on the motor case cover to prevent the brush from coming out of the terminal insert hole. In this type of fixing means, however, a certain degree of dimensional tolerance is required to allow the cut and raised piece to engage with the shouldered part, with the consequence that unwanted movement of the brush cannot be perfectly eliminated. Furthermore, provision of such a shouldered part on the inside wall surface requires relatively complicated forming works.

As described above, various fixing means of the brush have heretofore been devised, but all of those means have problems such as structural complexity and inefficiency in assembly works.

SUMMARY OF THE INVENTION

An object of this invention is to provide a brush device in which a brush integrally constructed of a commutator slide, a brush base and a terminal extending from the brush base is inserted into a terminal insert hole provided on a motor case, and sharp burrs on the tip of a cut and raised piece provided on the brush base of the brush is caused to cut into the inside wall surface of the terminal insert hole so that the brush is securely fixed to the motor case.

Another object of this invention is to provide a cut and raised piece whose upper edge has one or more projections so as to concentrate depression force to the tips of the projections to cause the edge of the cut and raised piece to firmly cut into the inside wall surface of the terminal insert hole.

A further object of this invention is to provide a small ridge at a location on the inside wall surface of the terminal insert hole corresponding to the edge of the cut and raised piece so as to cause the edge of the cut and raised piece to firmly cut into the ridge when the cut and raised piece poorly cuts into the inside wall surface because the brush is thin and is lacking in toughness.

A further object of this invention is to provide a groove having almost the same width as the cut and raised piece on the inside wall surface of the terminal insert hole so as to cause the edge of the cut and raised piece to engage with the groove to prevent the brush from slipping off in the width direction of the cut and raised piece.

Still a further object of this invention is to additionally provide a seat for the slit and formed piece so that the tip of the cut and raised piece cuts into the seat, when the inside wall of the terminal insert hole is used for other uses.

DETAILED DESCRIPTION OF THE INVENTION

Figure 1:
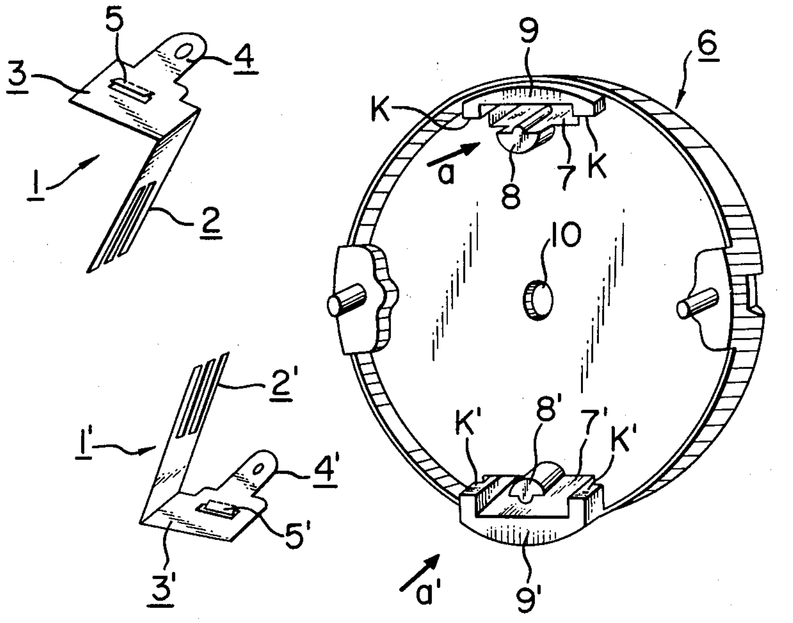
FIG. 1 is a perspective view illustrating the relation between a brush and a motor case cover in an embodiment of this invention.
Figure 2:
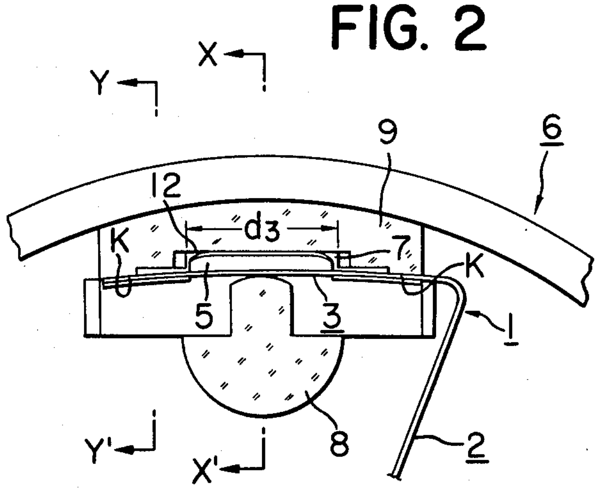
FIG. 2 is an elevation of an embodiment of this invention illustrating a state where a brush is fixed to a terminal insert hole provided on a motor case cover, as viewed from the direction shown by the arrow in FIG. 1.
Figure 3:
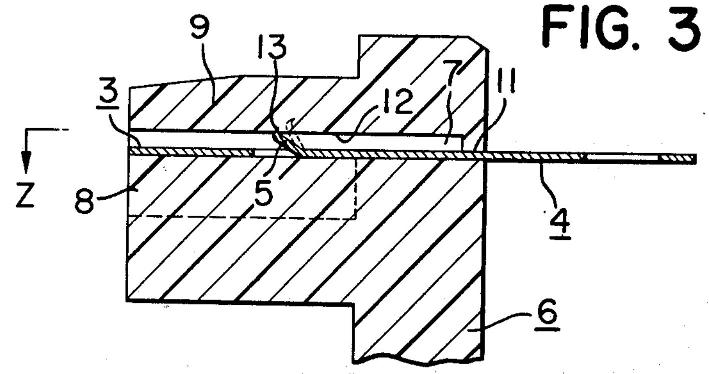
FIG. 3 is a cross section taken on line X-X′ in FIG. 2.
Figure 4:
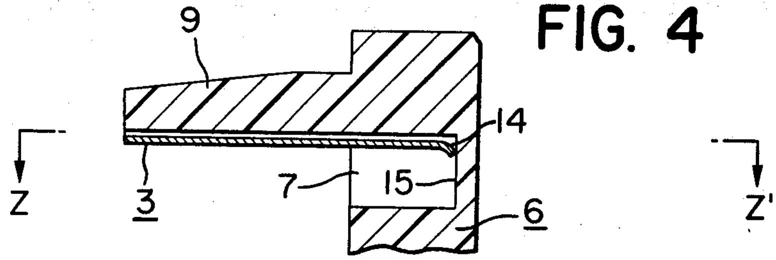
FIG. 4 is a cross section taken on line Y-Y′ in FIG. 2.

In FIG. 1, a perspective view illustrating the relation between the brush and the motor case cover in an embodiment of this invention, brushes 1 and 1' have commutator slides 2 and 2', brush bases 3 and 3', and terminal portions 4 and 4', respectively, as their integral parts, and cut and raised pieces 5 and 5' made of a resilient electrically conductive material, for example, beryllium-copper alloy, are provided on the base brushes 3 and 3'. In mounting brushes 1 and 1' on a motor case cover 6, the brushes 1 and 1' are inserted in the direction shown by arrows a and a' in the figure in a state as shown in the figure. That is, the terminal portions 4 and 4' and the brush bases 3 and 3' of the brushes 1 and 1' are inserted in terminal insert holes 7 and 7' on the motor case cover 6. In this case, the central parts of the brush bases 3 and 3' of the brushes 1 and 1' are supported by first supporting means 8 and 8' supporting the brushes 1 and 1', and the both sides of the brush bases 3 and 3' are supported by end faces K and K' of second supporting means 9 and 9' supporting the brushes 1 and 1', thus the brush bases 3 and 3' are subject to a flexing force and supported by the so-called three-point support. (In the figure, numeral 10 refers to a hole through which a motor shaft (not shown) is inserted.) FIG. 2 is an elevation as viewed from the direction shown by an arrow a, illustrating a state where the brush 1 is fixed to the terminal insert hole 7 provided on the motor case cover 6. When inserting the brush 1 into the motor case cover 6, as described above, the terminal portion 4 is passed through a through hole 11 provided on the motor case cover 6, and the cut and raised piece 5 is slid and inserted along the inside wall surface 12 of the second supporting means 9. Once inserted, the tip of the cut and raised piece 5 is caused to cut into the inside wall surface 11 by means of sharp burrs 13 provided on the upper edge of the cut and raised piece 5 on the side contacting the inside wall surface 11, as the brush base 3 is pulled slightly, thus the brush 1 is prevented from falling off to the rear, as shown in FIGS. 3 and 4, cross sections taken on lines X-X' and Y-Y' in FIG. 2. Not only the brush 1 is prevented from falling off to the rear, but also peripheral portion 14 on both sides of the terminal portion 4 of the brush base 3 is prevented from falling off to the front by being pushed to the vertical wall surface 15 of the terminal insert hole 7, as is clearly shown in FIG. 4 and FIG. 5, a plan view taken on line Z-Z' in FIG. 2.

In order to cause the tip of the cut and raised piece 5 to cut into the inside wall surface 12, as described above, it is necessay to provide the burrs 13 on the edge at the tip of the cut and raised piece 5 on the side contacting the inside wall surface 12. In forming the cut and raised piece 5 on the brush base 3, if the slitting (or lancing) operation and forming operation of the slit and formed piece 5 are performed in a single process, instead of providing a punched hole 16, as described later, the burrs at the tip of the cut and raised piece 5 are provided on the edge opposite to the side contacting the inside wall surface 12, and thus the edge on the side contacting the inside wall is unwantedly rounded. It is not proper, therefore, to form the slit and formed piece by the abovementioned process.

Figure 5:
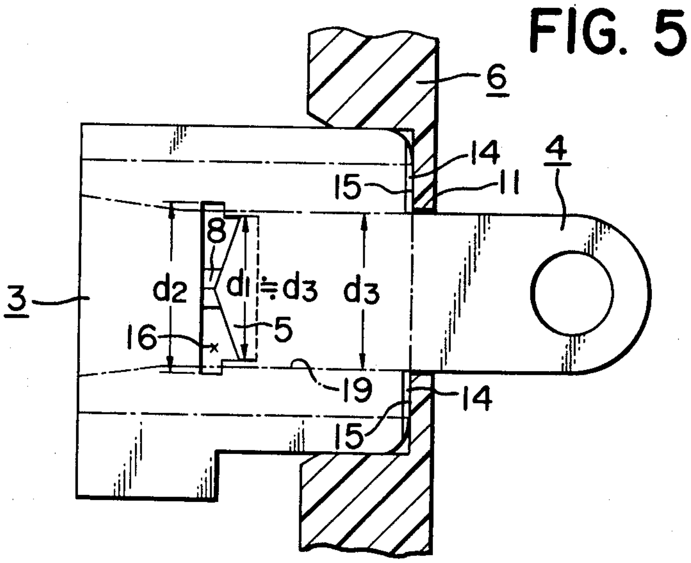
FIG. 5 is a plan view taken on line Z-Z′ in FIGS. 3 and 4.

For this reason, in forming the cut and raised piece 5 in this invention, a punched hole 16 having a width $d_2$ equal to or larger than the width $d_1$ of the cut and raised piece 5 is punched on the brush base 3 from the bottom surface (from the back side of paper in FIG. 5) upward as shown in FIG. 5. Along with this punching operation, both sides of the cut and raised piece 5 are lanced so that the cut and raised piece 5 can be raised subsequently. In the subsequent operation, the cut and raised piece 5 is raised along a dotted line in the figure from the bottom surface in FIG. 5 upward. By forming the cut and raised piece 5 in this way, the burrs 13 at the tip of the cut and raised piece 5 are produced on the edge on the side contacting the inside wall surface 12.

Figure 6:
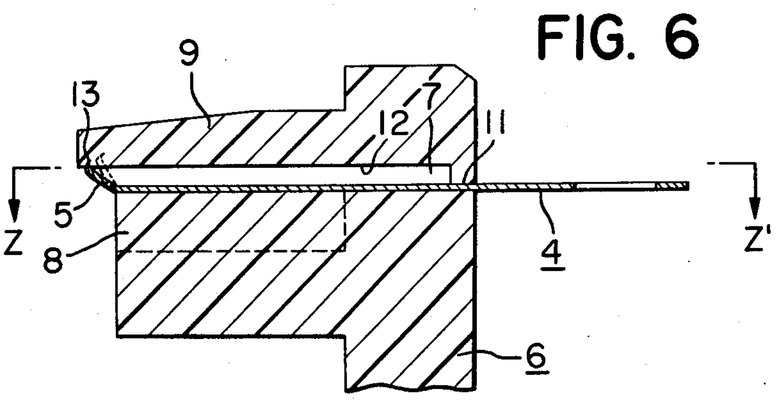
FIGS. 6 and 7 illustrate an embodiment of this invention in which a cut and raised piece is provided on a side opposite to a terminal portion 4 on the peripheral of the brush base, FIG. 6 being a cross section corresponding to FIG. 3, and FIG. 7 being a plan view corresponding to FIG. 5 and taken on line Z-Z′ in FIG. 6.
Figure 7:
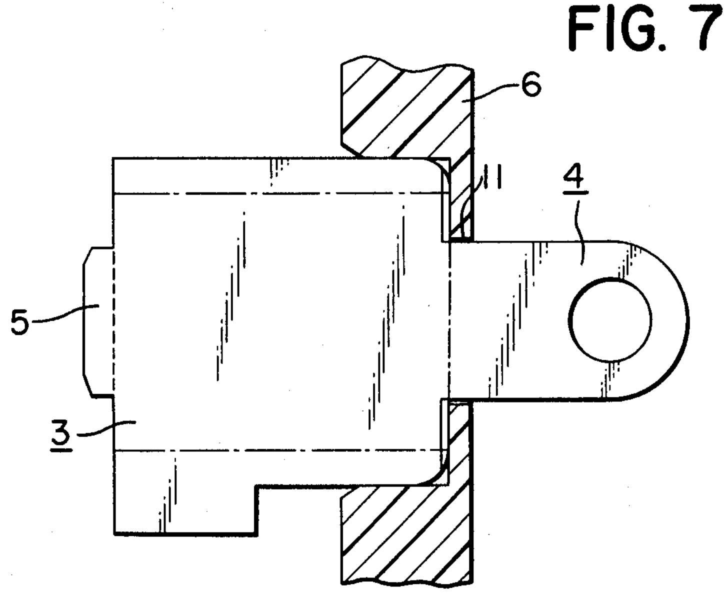

Another embodiment relating to the cut and raised piece 5 of this invention is shown in FIGS. 6 and 7, in which a projection corresponding to the cut and formed piece 5 is provided on the peripheral of the brush base 3 on the side opposite to the terminal portion 4.

In contrast with the embodiment shown in FIG. 5, in which the cut and raised piece 5 is provided on the inside surface of the brush base 3, in the embodiment shown in FIG. 7, a brush 1 of a shape having a projection corresponding to the cut and raised piece 5 on the side opposite to the terminal portion 4 is punched from the blank plate from the top surface (from the front side of the page in FIG. 7) downward, and then the projection provided on the peripheral of the brush base 3 is raised along a dotted line in FIG. 7 from the bottom surface (from the back side of the page in FIG. 7) upward to form the cut and raised piece 5. By forming the cut and raised piece 5 in this manner, the cut and raised piece 5 having the sharp burrs 13 on the edge on the side contacting the inside wall surface 12 of the terminal insert hole 7 as shown in FIG. 6 can be obtained. As described above, in the case of the embodiment shown in FIGS. 6 and 7, too, the burr 13 at the tip of the cut and raised piece 5 provided on the peripheral of the brush 3 cuts into the inside wall surface 12 of the terminal insert hole 7 by inserting the brush base 3 of the brush 1 into the terminal insert hole 7 and then slightly pulling back. This prevents the brush 1 from falling off and secures the brush 1 in the terminal insert hole 7.

Figure 8:
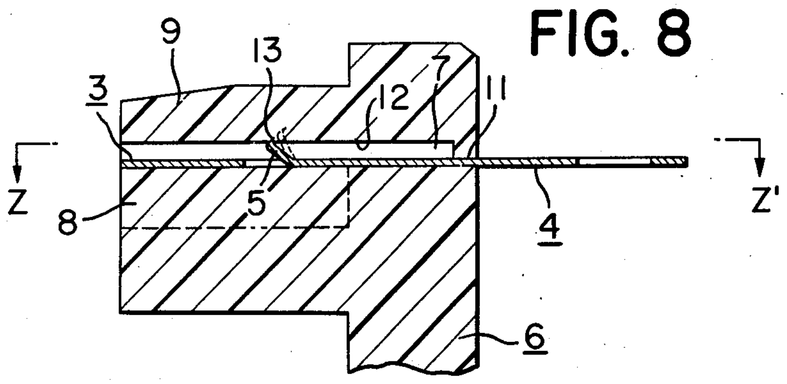
FIGS. 8 through 11 illustrate an embodiment of this invention in which one or more projections are provided at the tip of a slit and formed piece for concentrating depressing force, FIG. 8 being a cross section corresponding to FIG. 3, FIG. 9 being a plan view taken on line Z-Z′ in FIG. 8, corresponding to FIG. 5 illustrating an embodiment of this invention in which the projection at the tip of the cut and raised piece is of a pointed shape, FIG. 10 being a plan view corresponding to the portion A in FIG. 9 illustrating an embodiment in which the projection at the tip of the cut and raised piece is of an arc shape, and FIG. 11 being a plan view of the portion A in FIG. 9 illustrating an embodiment in which the projections at the tip of the cut and raised piece is of a plateau shape.
Figure 9:
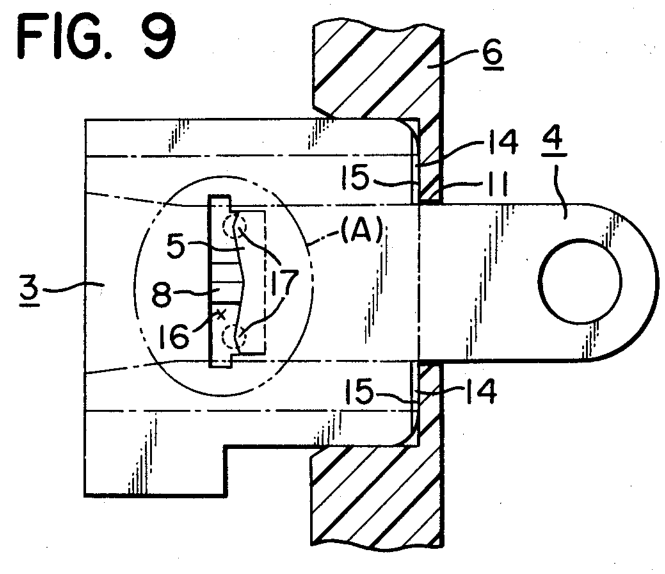
Figure 10:
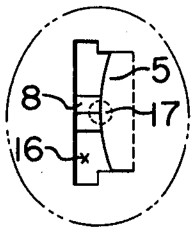
Figure 11:
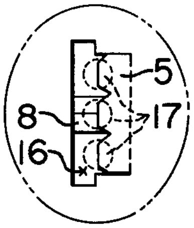

Still another embodiment of this invention is shown in FIGS. 8 through 11, in which one or more projections are provided at the tip of the cut and raised piece 5 to concentrate depressing force and sharp burrs are provided on the edge of the projections on the side contacting the inside wall surface 12. In the embodiment shown in FIG. 9 in which the sharp projections are provided at the tip of the cut and raised piece 5, the punched hole 16 is punched on the brush base 3 from the bottom surface (from the back side of the page in FIG. 9) upward so that the tip of the cut and raised piece 5 has the sharp projections 17 as shown in FIG. 9. As in the case of the embodiment shown in FIG. 5, both sides of the cut and raised piece 5 are also lanced together with the punching operation so that the cut and raised piece 5 can be raised subsequently. Thus, a cut and raised piece 5 whose tip has sharp projections 17 with sharply pointed burrs 13 on their edge on the side contacting the inside wall 12 of the terminal insert hole 7 can be obtained by raising the cut and raised piece 5 formed on the brush base 3 in the abovementioned manner along a dotted line in the figure to the direction of the upper surface. Similarly, a cut and raised piece 5 whose tip has the projections 17 of an arc or plateau shape with sharply pointed burrs 13 on the edge on the side contacting the inside wall surface 12 can be obtained as shown in FIGS. 10 and 11. Although 2, 1 and 3 projections are shown in FIGS. 9, 10 and 11, respectively, it is needless to say that a cut and raised piece 5 having one or more projections 17 can be formed.

In mounting the brush 1 having the cut and raised piece 5 formed in this manner at the brush base 3 on the motor case cover 6, depressing force is concentrated on the projections 17 having burrs 13 by inserting the brush base 3 of the brush 1 into the terminal insert hole 7 and then slightly pulling back. Thus, the tip of the cut and raised piece 5 is caused to tightly cut into the inside wall surface 12 to secure the brush 1 into the terminal insert hole 7.

Figure 12:
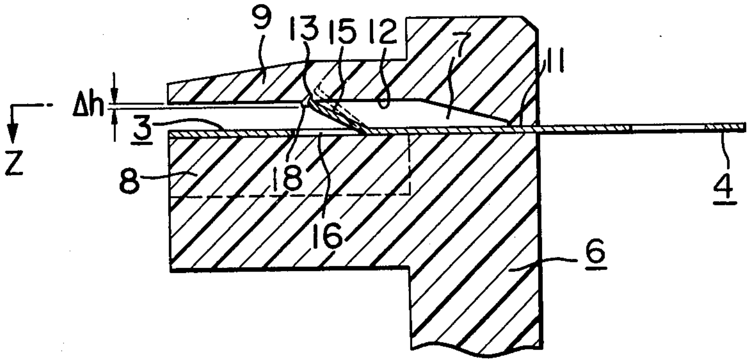
FIGS. 12 and 13 illustrate an embodiment of this invention in which a small ridge is provided on the inside wall of the terminal insert hole, FIG. 12 being a cross section corresponding to FIG. 3, and FIG. 13 being a plan view taken on line Z-Z′ in FIG. 12.
Figure 13:
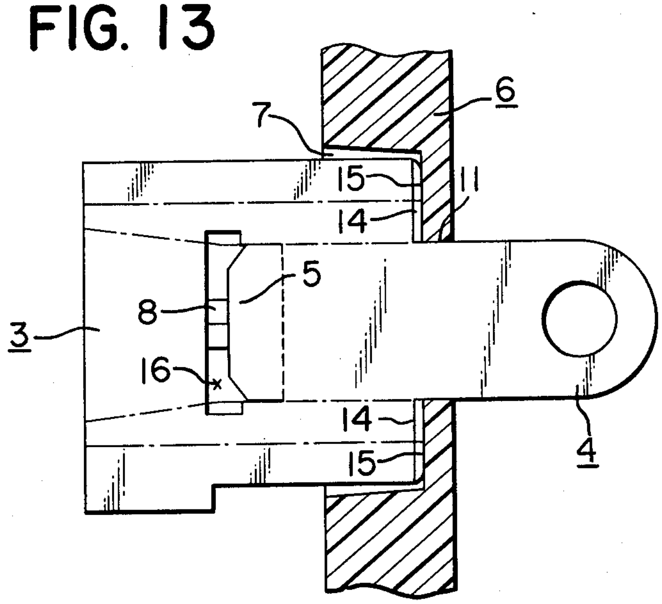

Meanwhile, brushes as thin as 0.1 mm or less are often used to maintain a force to contact the brush of a small motor with the commutator at a sufficiently low level, to prevent unwanted resonance resulting from the rotation of the motor and to minimize friction between the brush and commutator. In such a case, an effective cut by the burrs cannot be effected because of lack of resiliency in the cut and raised piece. When thin brushes are used, therefore, a small ridge is provided at an appropriate position on the inside wall surface of the terminal insert hole so that the tip of the cut and raised piece engages with the small ridge. An embodiment of this invention relating to such an arrangement is shown in FIGS. 12 and 13. As shown in FIG. 12, a small ridge 18 is provided at a position corresponding to the tip of the cut and raised piece 5 on the inside wall surface 12 of the terminal insert hole 7 provided on the motor case cover 6. Since the height ($\Delta h$ in the figure) of the small ridge 18 is as small as 0.03 mm, for example, the small ridge can be formed merely by providing a small concave groove on the metal mold used for molding the terminal insert hole 7. This causes no problem in extracting the mold after molding operation. In other words, there is no need for a special punch for the abovementioned molding operation. In this way, the small ridge 18 is provided on the inside wall surface of the terminal insert hole 7, and the burr 13 provided at the tip of the cut and raised piece 5 formed in the embodiments shown in FIGS. 3, 8 and 12 is caused to cut into the small ridge 18 to secure the brush 1 in the terminal insert hole 7.

Still another embodiment of this invention in which a groove having a width almost equal to the width of the cut and raised piece is provided on the inside wall surface of the terminal insert hole so that the cut and raised piece engages with the entire width of the groove to prevent lateral movement of the cut and raised piece of the brush while securing the brush to the motor case is shown in FIGS. 2 and 5. In FIGS. 2 and 5, a groove 19 having a width $d_3$ in the figure almost equal to the width $d_1$ in the figure of the cut and raised piece 5 is provided on the inside wall surface 12 of the terminal insert hole 7, and the cut and raised piece 5 is caused to engage with the entire width of the groove 19 having the width $d_3$ in the figure to prevent lateral movement of the cut and raised piece 5 while securing the brush 1 to the motor case 6.

Figure 14:
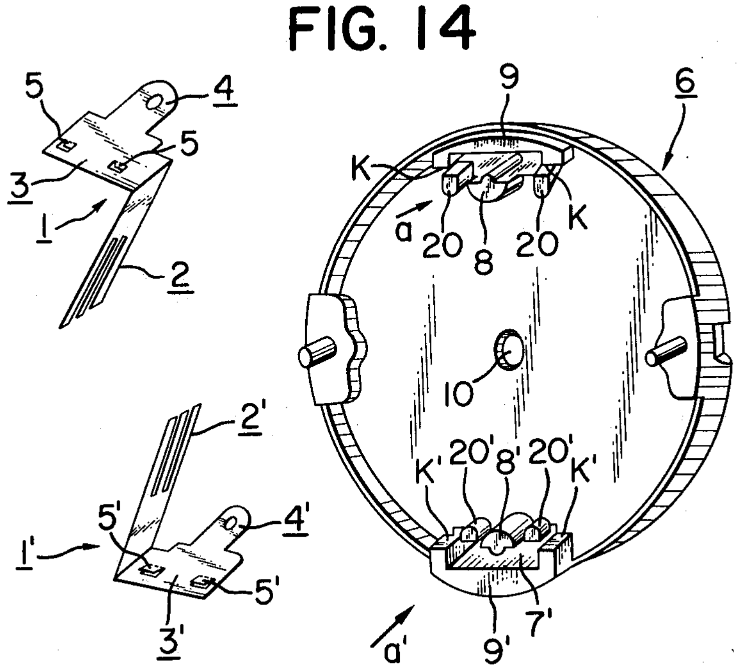
FIGS. 14 through 17 illustrate an embodiment of this invention in which the tip of the cut and raised piece 5 is caused to cut into a seat additionally provided, instead of being caused to cut into the inside wall surface of the terminal insert hole, FIG. 14 being a perspective view showing the relation between the brush and the motor case cover corresponding to FIG. 11, FIG. 15 being an elevation as viewed from the direction shown by arrow a, illustrating a state where the brush corresponding to FIG. 2 is fixedly inserted in the terminal insert hole, FIG. 16 being a cross section taken on line X-X′ in FIG. 15, and FIG. 17 being a plan view taken on line Z-Z′ in FIG. 16.
Figure 15:
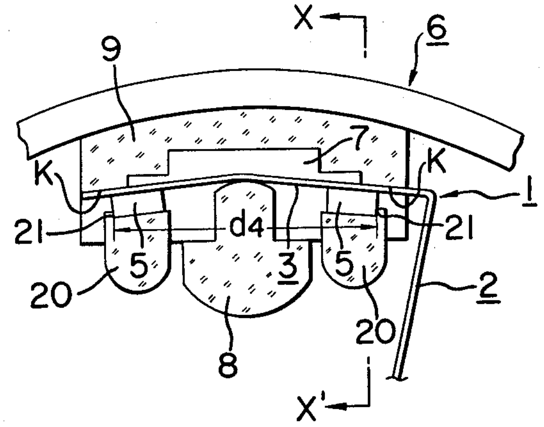
Figure 16:
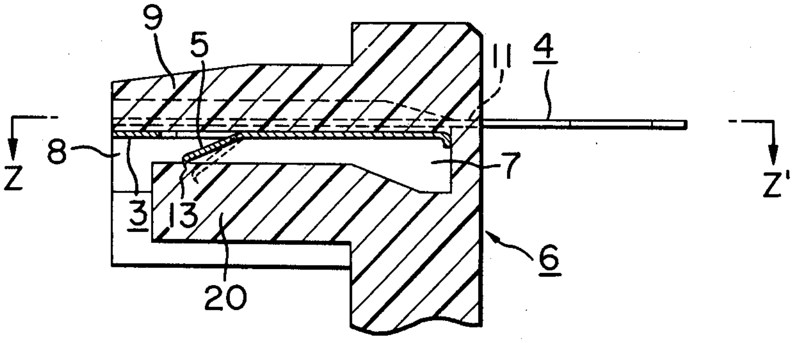
Figure 17:
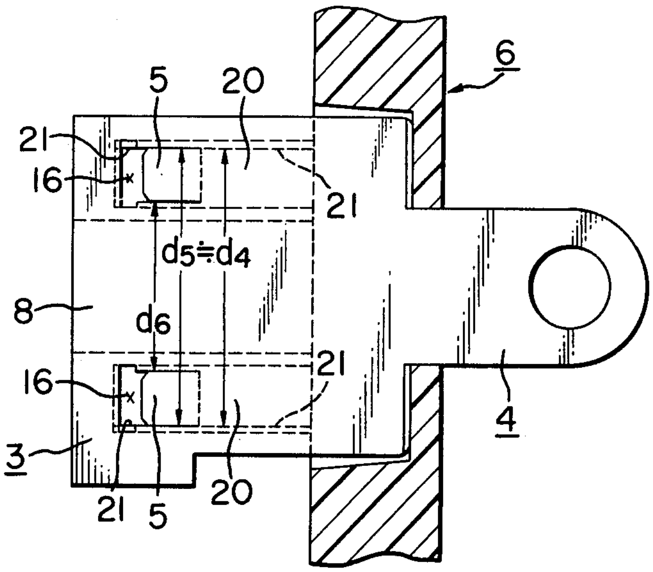

Still another embodiment of this invention is shown in FIGS. 14 through 17. As shown in the figures, the brush base 3 of the brush 1 has the cut and raised piece 5, and a seat 20 for receiving the tip of the cut and raised piece 5, together with the above-mentioned first supporting means 8, is provided on the motor case cover 6. Furthermore, as in the case of the cut and raised piece 5 in the embodiments described above, the sharp burr 13 is formed on the edge of the cut and raised piece 5 on the side contacting the seat 20. By inserting the brush base 3 of the brush 1 formed as mentioned above into the terminal insert hole 7 and then slightly pulling back, the burr 13 provided at the tip of the cut and raised piece 5 cuts into the seat 20, preventing the brush 1 from falling off. As shown in FIGS. 14 and 17, shouldered parts 21 for guiding the outer sides of the cut and raised piece 5 are provided on the seat 20 so that the distance between both shouldered parts, or $d_4$ in the figure, is almost equal to the distance between the outer sides of the cut and raised piece 5, or $d_5$ in the figure. In the embodiments shown in FIGS. 14 and 17, the shouldered parts 21 for guiding the outer sides of the cut and raised piece 5 are shown, but the distance between the shouldered parts 21, or $d_4$, may be set to be almost equal to the distance between the inner sides of the cut and raised piece 5, or $d_6$ in the figure so as to guide the inner sides of the cut and raised piece 5. By providing the shouldered parts 21 on the seat 20, the cut and raised piece 5 is guided by the shouldered parts 21, thus preventing lateral movement of the brush 1 in the terminal insert hole 7.

Figure 18:
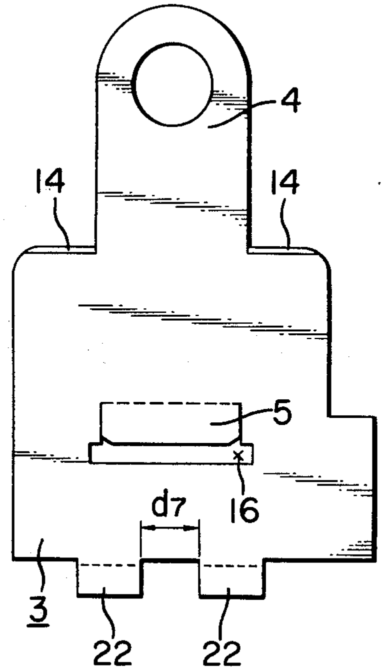
FIGS. 18 through 20 show an embodiment of this invention in which one or more retaining pieces are provided around the base of the brush, FIG. 18 being a plan view of the brush base, FIG. 19 being an elevation showing a state in which the brush in the embodiment shown in FIG. 18 is fixed to the terminal insert hole provided on the motor case cover, and FIG. 20 being a plan view showing an embodiment of this invention in which retainers are provided on the brush base having the terminal portion on a side opposite to the commutator slide.
Figure 19:
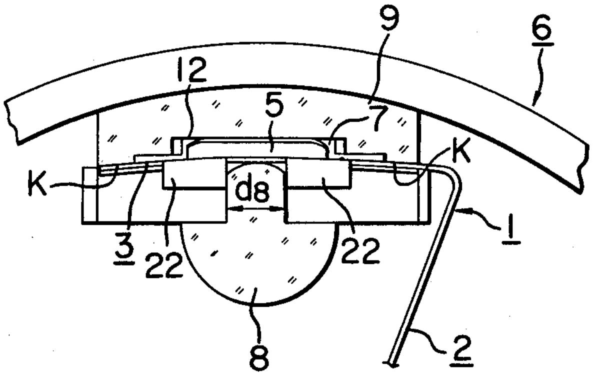
Figure 20:
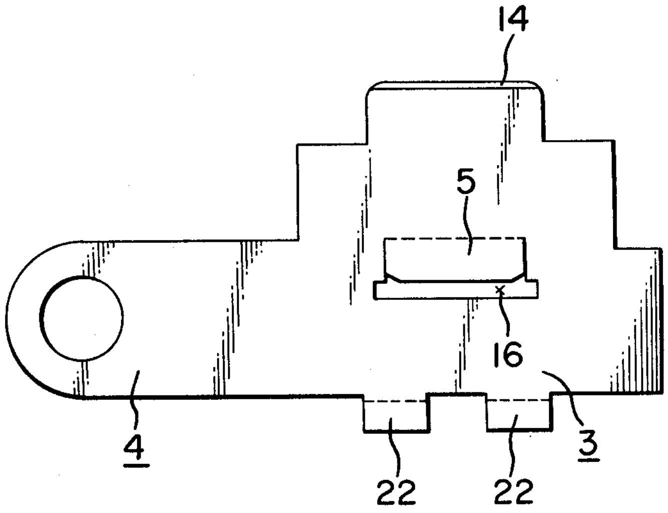

Still another embodiment of this invention is shown in FIGS. 18 through 20. As shown in FIG. 18, two pieces of projected retaining pieces 22 are provided on the edge on the side facing to the terminal portion 4 of the brush base 3. The retaining pieces 22 are formed in such a manner that the internal distance, d7 in FIG. 18, is almost equal to the width of the first supporting means 8 which supports the central part of the brush base 3, and the retaining pieces 22 are bent downward along the dotted lines shown in FIG. 18. As described above, when the brush 1 having the retaining pieces 22 is inserted into the terminal insert hole 7, the tip of the cut and raised piece 5 provided on the brush base 3 cuts into the inside wall 12 of the terminal insert hole 7 and is securely held in position, as in other embodiments, and at the same time, the two retainers 22 engage with the first supporting means 8 to prevent the brush 1 from laterally moving in the terminal insert hole 7.

In case the terminal portion 4 cannot be provided at the position shown in FIG. 18 because of the shape of the motor case cover or for some other reasons, the terminal portion 4 is formed by extending the brush base 3 toward the direction opposite to the commutator slide 2, as shown in FIG. 20. Particularly, when the terminal portion 4 is formed in such a shape as shown in FIG. 20, the lateral movement of the brush 1 in the terminal insert hole 7 can be prevented by providing the retainers 22 as shown in FIG. 20.

What is claimed is:

1. A brush device integrally constructed with a commutator slide, a brush base extending from the commutator slide and a terminal portion extending from the brush base, the brush device being operatively supported when the brush base is inserted into a terminal insert hole having an inside wall surface, the terminal insert hole being provided on a motor case cover, characterized in that the brush device has a cut and raised piece on the brush base portion thereof, the cut and raised piece having a sharp burr on the edge of its tip on the side thereof contacting the inside wall surface of the terminal insert hole, and that the sharp burr provided on the tip of the cut and raised piece on the brush base contacts and cuts into the inside wall surface to secure the brush device in the terminal insert hole.

2. A brush device as set forth in claim 1 wherein the brush base of the brush device has a punched hole having a width at least equal to the width of the cut and raised piece, one side of the cut and raised piece parallel to the width of the punched hole being raised in the form of a tongue-shaped piece, a sharp burr being provided on the edge of the tip of the cut and raised piece on the side thereof contacting the inside wall surface of the terminal insert hole.

3. A brush device as set forth in claim 1 wherein a projected cut and raised piece is provided on a part of the outer circumference of the brush base of the brush so as to contact the inside wall surface of the terminal insert hole and is raised in the form of a tongue-shaped piece, and sharp burrs are provided on the edge of the tip of the cut and raised piece on the side contacting the inside wall surface.

4. A brush device as set forth in claim 2 wherein one or more projections are provided on the tip of the cut and raised piece so as to concentrate the depressing force.

5. A brush device as set forth in claim 2 wherein small projected ridges corresponding to the tip of the cut and raised piece are provided on the inside wall surface of the terminal insert hole.

6. A brush device as set forth in claim 2 wherein a groove having a width almost equal to the width of the cut and raised piece is provided on the inside wall surface of the terminal insert hole so as to engage with the tip of the cut and raised piece.

7. A brush device as set forth in claim 2 wherein a seat for the cut and raised piece is provided on the circumference of the terminal insert hole provided on the motor case cover so as to receive the tip of the cut and raised piece.

8. A brush device as set forth in claim 2 wherein projected and bent retaining pieces are provided on part of the outer circumference of the brush base.

9. A brush device as set forth in claim 4 wherein a small projected ridge corresponding to the tip of the cut and raised piece is provided on the inside wall surface of the terminal insert hole.

10. A brush device as set forth in claim 4 wherein a groove having a width almost equal to the width of the cut and raised piece is provided on the inside wall surface so as to engage with the tip of the cut and raised piece.

11. A brush device as set forth in claim 4 wherein projected and bent retaining pieces are provided on part of the outer circumference of the brush base.

12. A brush device as set forth in claim 5 wherein a groove having a width almost equal to the width of the cut and raised piece is provided on the inside wall surface so as to engage with the tip of the cut and raised piece.

13. A brush device as set forth in claim 5 wherein a seat for the cut and raised piece is provided on the circumference of the terminal insert hole provided on the motor case cover so as to receive the tip of the cut and raised piece.

14. A brush device as set forth in claim 8 wherein a groove having a width almost equal to the width of the cut and raised piece is provided on the inside wall surface so as to engage with the tip of the cut and raised piece.

15. A brush device as set forth in claim 7 wherein the seat for the cut and raised piece has a groove having a width almost equal to the width of the cut and raised piece on the surface contacting the tip of the cut and raised piece so as to engage with the tip of the cut and raised piece.

* * * * *